United States Patent
Jayaraman et al.

(10) Patent No.: US 11,354,060 B2
(45) Date of Patent: Jun. 7, 2022

(54) APPLICATION SNAPSHOT FOR HIGHLY AVAILABLE AND DISTRIBUTED VOLUMES

(71) Applicant: Portworx, Inc., Los Altos, CA (US)

(72) Inventors: Vinod Jayaraman, San Francisco, CA (US); Ganesh Sangle, Los Altos, CA (US)

(73) Assignee: Portworx, Inc., Los Altos, CA (US)

( * ) Notice: Subject to any disclaimer, the term of this patent is extended or adjusted under 35 U.S.C. 154(b) by 88 days.

(21) Appl. No.: 16/127,506

(22) Filed: Sep. 11, 2018

(65) Prior Publication Data

US 2020/0081623 A1 Mar. 12, 2020

(51) Int. Cl.
| | | |
|---|---|---|
| *G06F 12/00* | (2006.01) | |
| *G06F 13/00* | (2006.01) | |
| *G06F 3/06* | (2006.01) | |
| *G06F 9/455* | (2018.01) | |

(52) U.S. Cl.
CPC .............. *G06F 3/065* (2013.01); *G06F 3/067* (2013.01); *G06F 3/0619* (2013.01); *G06F 3/0659* (2013.01); *G06F 3/0665* (2013.01); *G06F 9/45545* (2013.01)

(58) Field of Classification Search
CPC ...... G06F 3/065; G06F 3/0619; G06F 3/0659; G06F 3/0665; G06F 3/067; G06F 9/45545
USPC ........................................................ 711/162
See application file for complete search history.

(56) References Cited

U.S. PATENT DOCUMENTS

| | | | |
|---|---|---|---|
| 5,472,611 A | * | 12/1995 | von Nordenskjold ....................... B01D 21/0003 210/624 |
| 6,718,427 B1 | | 4/2004 | Carlson |
| 6,816,941 B1 | | 11/2004 | Carlson |
| 6,981,114 B1 | * | 12/2005 | Wu ...................... G06F 11/1469 711/112 |
| 7,089,395 B2 | | 8/2006 | Jacobson |
| 7,412,583 B2 | | 8/2008 | Burton |
| 7,434,017 B2 | | 10/2008 | Maruyama |
| 7,613,878 B2 | | 11/2009 | Mori |
| 7,617,371 B2 | | 11/2009 | Fujimoto |
| 7,657,578 B1 | * | 2/2010 | Karr .................... G06F 11/2069 707/610 |
| 7,693,879 B2 | * | 4/2010 | Nishikawa ............ G06F 16/273 707/623 |
| 7,734,888 B1 | | 6/2010 | Hamilton |
| 7,783,603 B2 | * | 8/2010 | Wayda ................. G06F 11/1435 707/639 |
| 7,783,606 B2 | * | 8/2010 | Chang .................. G06F 11/1466 707/657 |
| 7,809,917 B2 | | 10/2010 | Burton |
| 7,873,809 B2 | | 1/2011 | Kano |
| 7,945,748 B2 | | 5/2011 | Shibayama |
| 8,055,723 B2 | | 11/2011 | Acedo |

(Continued)

*Primary Examiner* — Sheng Jen Tsai
(74) *Attorney, Agent, or Firm* — ALG Intellectual Property, LLC

(57) ABSTRACT

A single application may rely on data storage provided by a plurality of virtual data storage volumes mounted on one or more compute nodes. A crash-consistent snapshot of the state of the application may be generated. Each of the virtual data storage volumes may be quiesced prior to the capture of a plurality of volume-level snapshots, after which each volume is unquiesced. The crash-consistent snapshot may be used to restore the application to the state at the time the snapshot was captured.

20 Claims, 8 Drawing Sheets

(56) References Cited

U.S. PATENT DOCUMENTS

| | | | |
|---|---|---|---|
| 8,074,035 B1* | 12/2011 | Per | G06F 11/1458 711/162 |
| 8,086,808 B2 | 12/2011 | Ichikawa | |
| 8,140,794 B2* | 3/2012 | Prahlad | G06F 3/067 711/162 |
| 8,225,057 B1 | 7/2012 | Zheng | |
| 8,230,069 B2 | 7/2012 | Korupolu | |
| 8,250,327 B2 | 8/2012 | Fuji | |
| 8,291,159 B2 | 10/2012 | Rajagopal | |
| 8,359,429 B1* | 1/2013 | Sharma | G06F 11/2064 711/111 |
| 8,489,845 B2 | 7/2013 | Ozaki | |
| 8,495,331 B2 | 7/2013 | Matsumoto | |
| 8,516,215 B2 | 8/2013 | Satoyama | |
| 8,539,194 B2 | 9/2013 | Inoue | |
| 8,612,679 B2 | 12/2013 | Schnapp | |
| 8,612,776 B2 | 12/2013 | Hakamata | |
| 8,745,354 B2 | 6/2014 | Mori | |
| 8,769,235 B2 | 7/2014 | Satoyama | |
| 8,775,730 B2 | 7/2014 | Inoue | |
| 8,862,833 B2 | 10/2014 | Noll | |
| 8,863,139 B2 | 10/2014 | Kakeda | |
| 8,880,810 B2 | 11/2014 | Yamamoto | |
| 9,171,002 B1* | 10/2015 | Mam | G06F 3/0679 |
| 9,182,926 B2 | 11/2015 | Naganuma | |
| 9,201,607 B2 | 12/2015 | Satoyama | |
| 9,229,860 B2 | 1/2016 | Matsuzawa | |
| 9,237,131 B2 | 1/2016 | Nahum | |
| 9,417,815 B1* | 8/2016 | Elisha | G06F 3/067 |
| 9,521,115 B1* | 12/2016 | Woolward | H04L 63/1416 |
| 9,560,081 B1* | 1/2017 | Woolward | H04L 63/0263 |
| 9,569,245 B2 | 2/2017 | Iwamatsu | |
| 9,680,852 B1* | 6/2017 | Wager | H04L 63/1441 |
| 9,747,036 B2 | 8/2017 | Maki | |
| 9,760,290 B2 | 9/2017 | Jayaraman | |
| 9,760,294 B2 | 9/2017 | Miwa | |
| 9,787,639 B1* | 10/2017 | Sun | H04L 63/20 |
| 10,365,980 B1 | 7/2019 | Bromling | |
| 10,452,293 B2 | 10/2019 | Yamamoto | |
| 10,503,441 B2 | 12/2019 | Israni et al. | |
| 10,564,870 B1 | 2/2020 | Greenwood | |
| 10,594,571 B2 | 3/2020 | Dippenaar | |
| 10,628,088 B2 | 4/2020 | Matsushita | |
| 10,628,200 B2 | 4/2020 | Hadas | |
| 10,664,182 B2 | 5/2020 | Oohira | |
| 10,949,125 B2 | 3/2021 | Liguori | |
| 10,956,063 B2 | 3/2021 | Yamamoto | |
| 2002/0103889 A1 | 8/2002 | Markson | |
| 2004/0068611 A1 | 4/2004 | Jacobson | |
| 2006/0107016 A1 | 5/2006 | Murotani | |
| 2006/0107017 A1 | 5/2006 | Serizawa | |
| 2006/0218346 A1* | 9/2006 | Nagumo | G06F 11/1466 711/114 |
| 2006/0282641 A1 | 12/2006 | Fujimoto | |
| 2007/0162716 A1* | 7/2007 | Yagisawa | G06F 11/2071 711/162 |
| 2007/0233987 A1 | 10/2007 | Maruyama | |
| 2007/0233992 A1 | 10/2007 | Sato | |
| 2008/0028143 A1 | 1/2008 | Murase | |
| 2008/0222376 A1 | 9/2008 | Burton | |
| 2008/0281875 A1* | 11/2008 | Wayda | G06F 11/1435 |
| 2008/0281877 A1* | 11/2008 | Wayda | G06F 11/1435 |
| 2009/0150639 A1 | 6/2009 | Ohata | |
| 2009/0228589 A1 | 9/2009 | Korupolu | |
| 2009/0240880 A1 | 9/2009 | Kawaguchi | |
| 2009/0254636 A1 | 10/2009 | Acedo | |
| 2010/0011185 A1 | 1/2010 | Inoue | |
| 2010/0017577 A1 | 1/2010 | Fujimoto | |
| 2010/0082900 A1 | 4/2010 | Murayama | |
| 2010/0100604 A1 | 4/2010 | Fujiwara | |
| 2010/0180094 A1* | 7/2010 | Min | G06F 11/2058 711/162 |
| 2010/0332882 A1 | 12/2010 | Nayak | |
| 2011/0060885 A1 | 3/2011 | Satoyama | |
| 2011/0066823 A1 | 3/2011 | Ando | |
| 2011/0153697 A1* | 6/2011 | Nickolov | H04L 67/10 707/827 |
| 2011/0161406 A1 | 6/2011 | Kakeda | |
| 2011/0185135 A1 | 7/2011 | Fuji | |
| 2011/0185139 A1 | 7/2011 | Inoue | |
| 2011/0191537 A1 | 8/2011 | Kawaguchi | |
| 2011/0252214 A1 | 10/2011 | Naganuma | |
| 2011/0264868 A1 | 10/2011 | Takata | |
| 2011/0276772 A1 | 11/2011 | Ohata | |
| 2011/0282842 A1* | 11/2011 | Popovski | G06F 11/1435 707/649 |
| 2012/0166751 A1 | 6/2012 | Matsumoto | |
| 2012/0173838 A1 | 7/2012 | Noll | |
| 2012/0226885 A1 | 9/2012 | Mori | |
| 2012/0311260 A1 | 12/2012 | Yamagiwa | |
| 2013/0054529 A1* | 2/2013 | Wang | G06F 11/1448 707/639 |
| 2013/0117448 A1 | 5/2013 | Nahum | |
| 2014/0006726 A1 | 1/2014 | Yamamoto | |
| 2014/0108680 A1* | 4/2014 | Brown | G06F 3/0659 710/39 |
| 2014/0281339 A1 | 9/2014 | Satoyama | |
| 2014/0372723 A1 | 12/2014 | Bobroff | |
| 2014/0380005 A1* | 12/2014 | Furuya | G06F 3/0619 711/162 |
| 2015/0277955 A1 | 10/2015 | Iwamatsu | |
| 2015/0331793 A1 | 11/2015 | Matsuzawa | |
| 2016/0004476 A1 | 1/2016 | Emaru | |
| 2016/0092132 A1 | 3/2016 | Hildebrand | |
| 2016/0094410 A1 | 3/2016 | Anwar | |
| 2016/0253114 A1 | 9/2016 | Deguchi | |
| 2017/0024232 A1* | 1/2017 | Barve | G06F 3/0689 |
| 2017/0134422 A1* | 5/2017 | Shieh | H04L 63/20 |
| 2017/0180421 A1* | 6/2017 | Shieh | H04L 63/10 |
| 2017/0090774 A1 | 8/2017 | Dambal | |
| 2017/0220282 A1 | 8/2017 | Dambal | |
| 2017/0222890 A1 | 8/2017 | Dippenaar | |
| 2017/0223033 A1* | 8/2017 | Wager | G06F 21/577 |
| 2017/0308316 A1 | 10/2017 | Yamamoto | |
| 2017/0351695 A1* | 12/2017 | Rao | G06F 21/6218 |
| 2017/0351743 A1* | 12/2017 | Jayaraman | G06F 16/273 |
| 2017/0359221 A1 | 12/2017 | Hori | |
| 2017/0374032 A1* | 12/2017 | Woolward | G06F 9/45558 |
| 2017/0374101 A1* | 12/2017 | Woolward | H04L 63/0263 |
| 2018/0004447 A1 | 1/2018 | Oohira | |
| 2018/0189121 A1* | 7/2018 | Jobi | G06F 9/5016 |
| 2018/0189122 A1* | 7/2018 | Jobi | G06F 9/455 |
| 2018/0189176 A1* | 7/2018 | Jobi | G06F 16/162 |
| 2018/0191779 A1* | 7/2018 | Shieh | H04L 63/1425 |
| 2018/0205612 A1* | 7/2018 | Rao | H04L 67/1097 |
| 2018/0260125 A1* | 9/2018 | Botes | G06F 3/067 |
| 2018/0288129 A1* | 10/2018 | Joshi | H04L 43/08 |
| 2019/0018715 A1* | 1/2019 | Behrendt | G06F 9/542 |
| 2019/0129740 A1 | 5/2019 | Hadas | |
| 2019/0146947 A1* | 5/2019 | Viayasaradhi | G06F 16/128 707/639 |
| 2019/0163405 A1* | 5/2019 | Israni | G06F 3/0622 |
| 2019/0220297 A1* | 7/2019 | Rao | G06F 9/45558 |
| 2019/0222646 A1* | 7/2019 | Rao | H04L 67/1097 |
| 2019/0266022 A1* | 8/2019 | Israni | G06F 9/5016 |
| 2019/0272222 A1 | 9/2019 | Wei | |
| 2019/0286326 A1* | 9/2019 | Pabon | H04L 67/1097 |
| 2019/0369895 A1* | 12/2019 | Israni | G06F 3/0607 |
| 2019/0370023 A1* | 12/2019 | Israni | G06F 9/5077 |
| 2020/0042213 A1 | 2/2020 | Yamamoto | |
| 2020/0042393 A1* | 2/2020 | Israni | G06F 11/1451 |
| 2020/0073552 A1* | 3/2020 | Sangle | G06F 3/0619 |
| 2020/0104151 A1 | 4/2020 | Shibayama | |
| 2020/0264956 A1 | 8/2020 | Thomas | |
| 2020/0409600 A1 | 12/2020 | Liguori | |

* cited by examiner

APPLICATION SNAPSHOT FOR HIGHLY AVAILABLE AND DISTRIBUTED VOLUMES

TECHNICAL FIELD

The present disclosure relates generally to containerized applications and more specifically to containerized scalable storage applications.

DESCRIPTION OF RELATED ART

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to methods, systems, device, and computer readable media associated with the creation and restoration of application snapshots for applications associated with a plurality of virtual storage volumes. According to various embodiments, each of a plurality of virtual data storage volumes mounted on one or more compute nodes may be quiesced by storing in one or more queues each of a plurality of data access requests. Each data access request may indicate a respective storage volume in which to read or write data. Each of the plurality of data access requests is not executed while the virtual data storage volumes are quiesced. Each of the one or more compute nodes includes a processor and a memory module.

According to various embodiments, a respective snapshot of each of the plurality of virtual data storage volumes may be constructed. Each of the respective snapshots may capture a respective state of the respective virtual data storage volume at a designated point in time after the plurality of virtual data storage volumes are quiesced. After the snapshots have been constructed, each of the plurality of virtual data storage volumes may be unquiescing by executing the queued data access requests.

In particular embodiments, the plurality of virtual data storage volumes may store data associated with a designated application executed at one or more of the compute nodes. The respective snapshots may combine to provide a consistent restore point for restoring a state of the designated application to the designated point in time. Each of the virtual storage volumes may be implemented within a copy-on-write storage framework.

In particular embodiments, each snapshot may include a respective set of references to data blocks stored in the respective storage volume at the designated point in time. A first data access request may identify data to write to a first location on a first one of the virtual data storage volumes. A second data access request may identify data to read from a second location on a second one of the virtual data storage volumes.

In particular embodiments, a designated one of the virtual storage volumes may include storage space on a plurality of disks accessible to the one or more compute nodes via a network. Each of the one or more compute nodes may include a respective container engine application executed by an operating system. The container engine application may provide a standardized platform for the instantiation and execution of containerized applications. The containerized applications may include a storage driver configured to manage the designated virtual storage volume.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
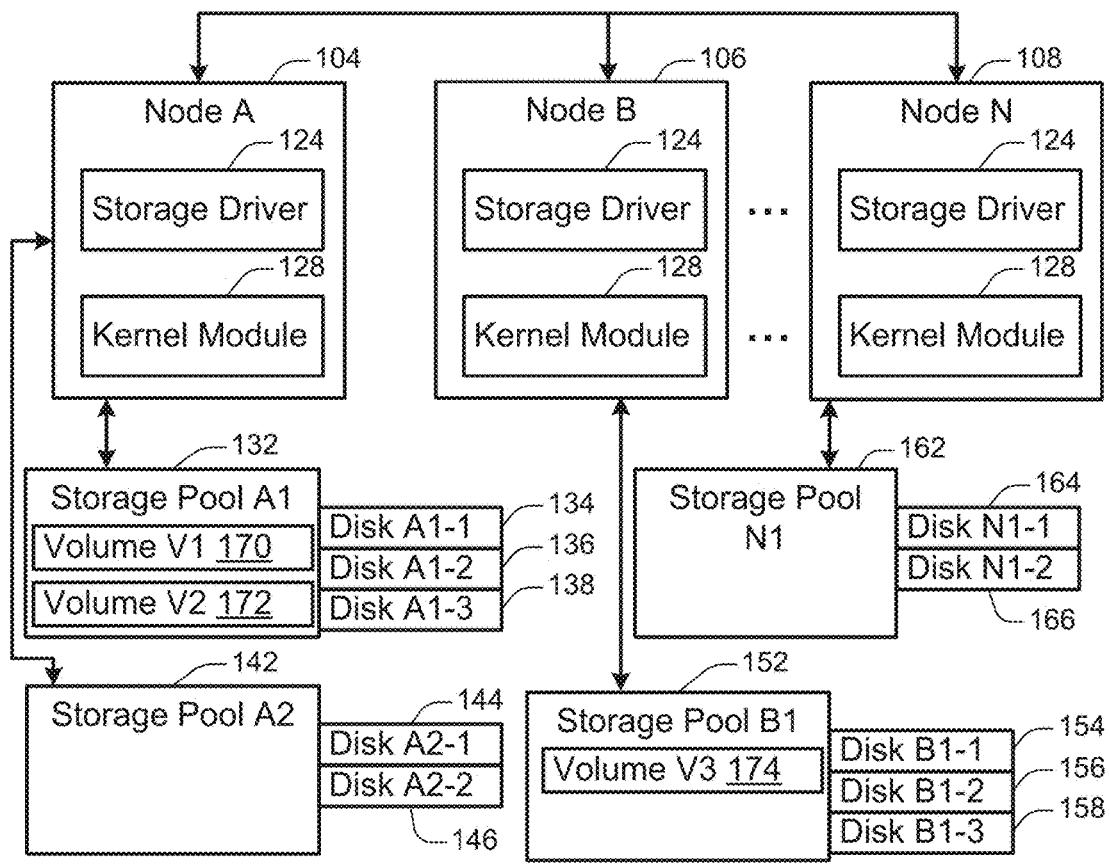
FIG. 1 illustrates an example of an arrangement of components in a distributed storage system, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

According to various embodiments, a virtual storage volume may provide storage for one or more applications. A virtual storage volume can span one or more different physical disks and can be made accessible to potentially many different compute nodes. However, a virtual storage volume will often be mounted on a specific compute node for the purpose of avoiding conflicts and race conditions in writing data to the storage volume.

In some implementations, a snapshot of a virtual storage volume may capture the state of the virtual storage volume at a designated point in time. The snapshot may include references to data included in the virtual storage volume, and this data may remain stored on disk even if deleted or overwritten in the virtual storage volume. In this way, the snapshot may be used to restore the virtual storage volume to the designated point in time.

In some embodiments, an application may employ more than one virtual storage volume. For example, WordPress may be implemented as a containerized application and may employ different virtual storage volumes for different aspects of the applications. In order to back up such an application, snapshots may be captured of each of the associated volumes. When using conventional techniques, however, these snapshots may be captured at different moments in time. Accordingly, the collection of snapshots for the different volumes would not provide a consistent recovery point for the entire application that allows the application to be restored to a designated point in time.

Techniques and mechanisms described herein provide for capturing a snapshot of an application that is associated with more than one storage volume. According to various embodiments, the volumes associated with the application may be identified and quiesced. Then, a snapshot may be captured for each volume. Finally, the volumes may be unquiesced, and reading and writing operations resumed.

In some embodiments, techniques and mechanisms described herein may provide for the creation of consistent recovery points for complex applications spanning potentially many different volumes. Such snapshots may be captured in a manner that is efficient in terms of memory and processor utilization. Accordingly, techniques and mechanisms described herein may provide for improved performance of containerized application systems that include data storage implemented on virtual storage volumes.

According to various embodiments, techniques and mechanisms described herein may facilitate the creation of a crash-consistent snapshot of an application. An application may rely on storage space on a plurality of virtual storage volume mounted on one or more compute nodes. The virtual storage volumes may be quiesced, and then pending write requests may be executed. After the pending write requests are executed, a snapshot of each volume may be captured. In this way, the restoration of all volumes associated with the application to the snapshotted state would restore the state of the application to the time at which the last virtual storage volume was quiesced.

Techniques and mechanisms described herein facilitate the operation of a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, each compute node may include a storage driver configured to facilitate access between applications loaded on the compute node and one or more storage volumes mounted on the compute node. The storage driver may be implemented as a containerized application having special permissions beyond those typically accorded to containerized applications in the system, a configuration referred to herein as a privileged storage container. Techniques and mechanisms related to privileged storage containers are discussed in further detail with respect to FIG. 6.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

FIG. 1 illustrates an example of an arrangement of components in a containerized storage system 100, configured in accordance with one or more embodiments. The storage system 100 includes application nodes 104, 106, and 108. Each node has implemented thereon a storage driver 124 and a kernel module 128. Each node has access to zero or more storage pools such as the storage pools A1 132, A2 142, B1 152, and N1 162. Each storage pool includes zero or more virtual storage volumes such as the virtual storage volumes V1 170, V2 172, and V3 174. Each virtual storage volume includes storage space on one or more disks associated with the storage pool such as the disks A1-1 134, A1-2 136, A1-3 138, A2-1 144, A2-2 146, N1-1 164, N1-2 166, B1-1 154, B1-2 156, and B1-3 158.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
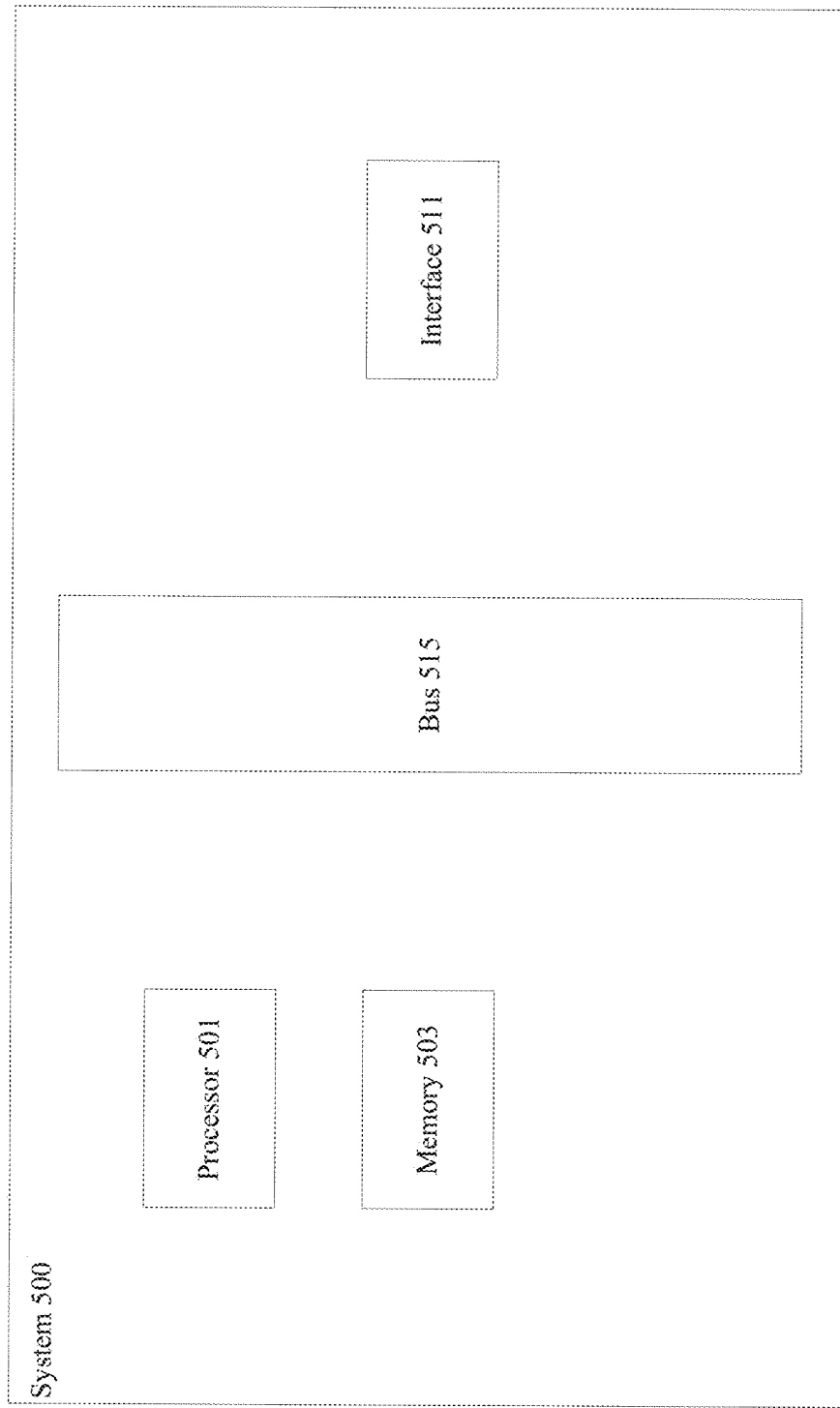
FIG. 5 illustrates an example of a server, configured in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 6.

According to various embodiments, each node may be configured to instantiate and execute one or more containerized application instance. Each node may include many components not shown in FIG. 1. These components may include hardware components, such as those discussed with respect to FIG. 5, and/or software components, such as those discussed herein.

According to various embodiments, each node may include a storage driver 124. The storage driver 124 may perform any of various types of storage-related operations for the node. For example, the storage driver 124 may facilitate the mounting or unmounting of virtual storage volumes. As another example, the storage driver 124 may facilitate data storage or retrieval requests associated with a mounted virtual storage volume. The storage driver 124 may be substantially similar or identical to the privileged storage container 616 shown in FIG. 6.

In some embodiments, each node may include a kernel module 128. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as the pool 132 may include potentially many different disks.

According to various embodiments, the virtual storage volumes 170, 172, and 174 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In particular embodiments, an application may rely on data storage provided by virtual storage volumes mounted on more than one compute node. For example, an application executed on Node N 108 may employ each of the virtual storage volumes V1 170, V2 172, and V3 174 for storage volume. Techniques and mechanisms described herein may be used to construct crash-consistent snapshots of applications associated with virtual storage volumes distributed across multiple nodes in this fashion.

Figure 2:
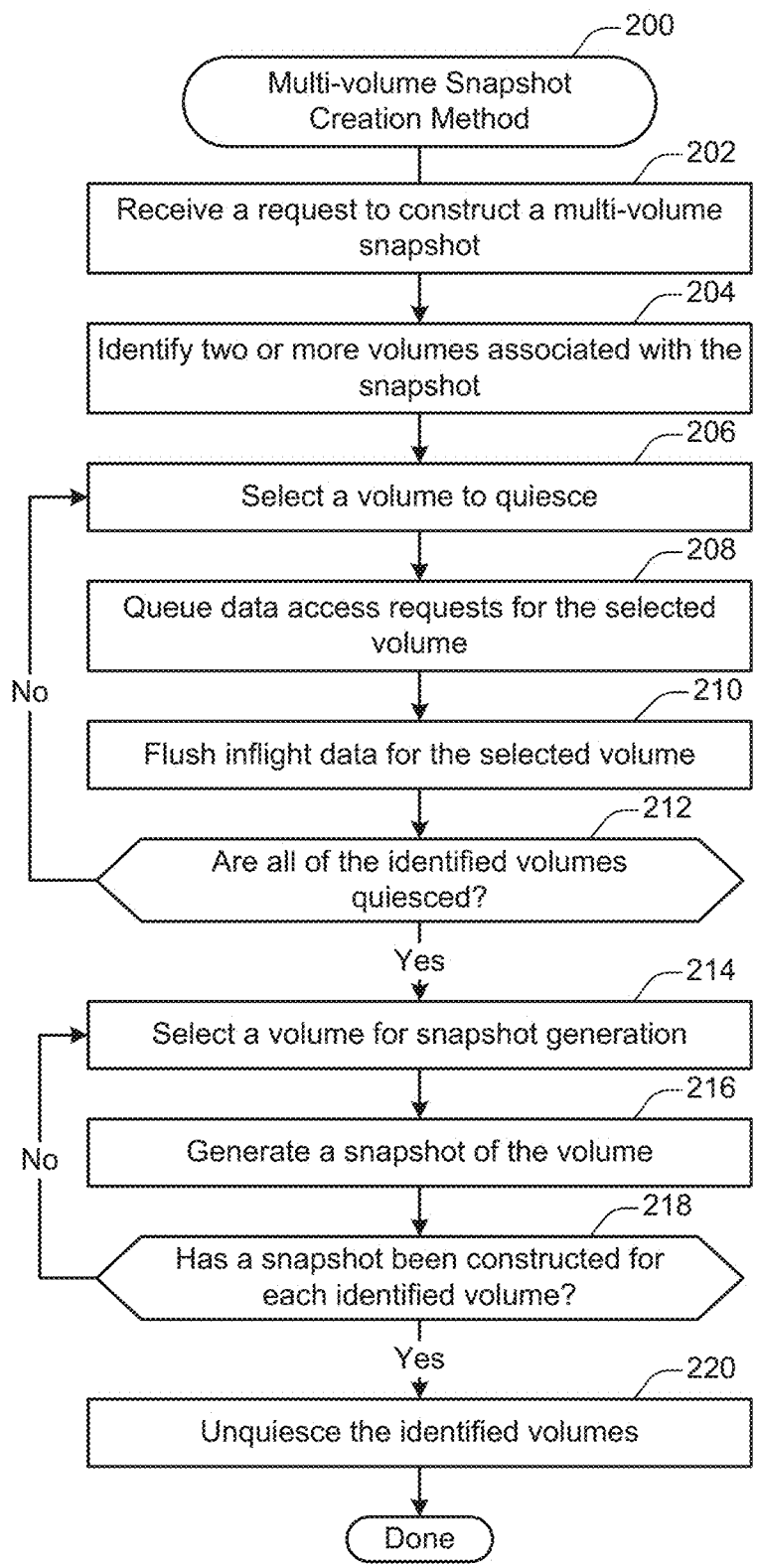
FIG. 2 illustrates an example of a method for creating a multi-volume snapshot, performed in accordance with one or more embodiments.

FIG. 2 illustrates an example of a method 200 for creating a multi-volume snapshot, performed in accordance with one or more embodiments. The method 200 may be performed at a compute node such as the Node A 104 shown in FIG. 1.

At 202, a request is received to construct a multi-volume snapshot. In some implementations, the request may be generated automatically. For example, an automated backup procedure may periodically trigger the construction of a multi-volume snapshot for a containerized application. Alternately, the request may be generated manually. For example, a systems administrator may generate a request to back up a containerized application associated with more than one volume.

Two or more volumes associated with the snapshot are identified at operation 204. In some embodiments, the volumes may be explicitly identified as part of the request received at operation 202. For instance, the request may specify a set of volumes to include in the snapshot.

In some implementations, the volumes may be determined based on the subject of the request received at operation 202. For instance, the request may specify one or more applications for which to construct a snapshot. Then, the system may identify specific volumes that are associated with the applications.

At operations 206-212, the volumes are quiesced. According to various embodiments, volumes may be quiesced in serial or in parallel. Quiescing a volume refers to any suitable operations for freezing data access requests to the volume.

According to various embodiments, one or more of the volumes may be mounted on the compute node at which the application is located. Alternately, or additionally, one or more of the volumes may be mounted at another compute node in communication via a network. For example, the application may rely on data storage from potentially many different virtual storage volumes mounted on potentially many different compute nodes.

A volume is selected to quiesce at operation 206. In some embodiments, if the volumes are quiesced in sequence rather than in parallel, then any suitable ordering of the volumes may be used.

At 208, data access requests for the selected volume are queued. According to various embodiments, queueing data access request may involve storing any requests to read data from or write data to the selected volume after a designated point in time. When storing the requests, timing information may be maintained so that the requests may later be executed in the order in which they were received.

Inflight data for the selected volume is flushed at operation 210. In some embodiments, flushing inflight data may involve finishing the execution of any data access requests received prior to the point at which the data access requests were queued at operation 208. For example, if a request to write data is already in the process of being executed, then the execution of the request may be completed, with subsequent write requests being queued at operation 208. As another example, if a request to read data from the volume is already in the process of being executed, then the execution of the request may be completed, with subsequent read requests being queued at operation 208.

In particular embodiments, the multi-volume snapshot creation method 200 may facilitate the creation of a crash-consistent snapshot of an application. The state of an application may include both data stored on persistent storage and pending write requests stored in memory. Because pending write requests are executed prior to constructing a snapshot of each volume, the multi-volume snapshot reflects the complete state of the application. In this way, the restoration of all volumes associated with the application to the snapshotted state would restore the state of the application to the time at which the last virtual storage volume was quiesced.

Snapshots of each volume are generated at operations 214-218. At 214, a volume is selected for snapshot generation. At 216, a snapshot of the selected volume is generated. Techniques for generating a snapshot of a volume are discussed in additional detail with respect to FIG. 3. At 218, a determination is made as to whether a snapshot has been constructed for each identified volume. Snapshots of volumes may be generated sequentially or in parallel. If generated sequentially, then the snapshots may be generated in any suitable order.

In particular embodiments, snapshots may be created and/or stored in a distributed manner. For example, different storage volumes may be mounted on different compute nodes. These compute nodes may then construct the snapshots of virtual storage volumes in parallel. The snapshots itself may be stored on the nodes which store the data for virtual volumes.

When snapshots have been constructed for each of the identified volumes, the identified volumes are unquiesced at operation 220. According to various embodiments, unquiescing the identified volumes may involve any operations suitable to returning the identified volumes to a state in which read and write requests are executed. For example, data read and write operations queued in operation 208 may be executed sequentially in the order in which they were received. Then, subsequently received data read and write operations may be executed as well.

Figure 3:
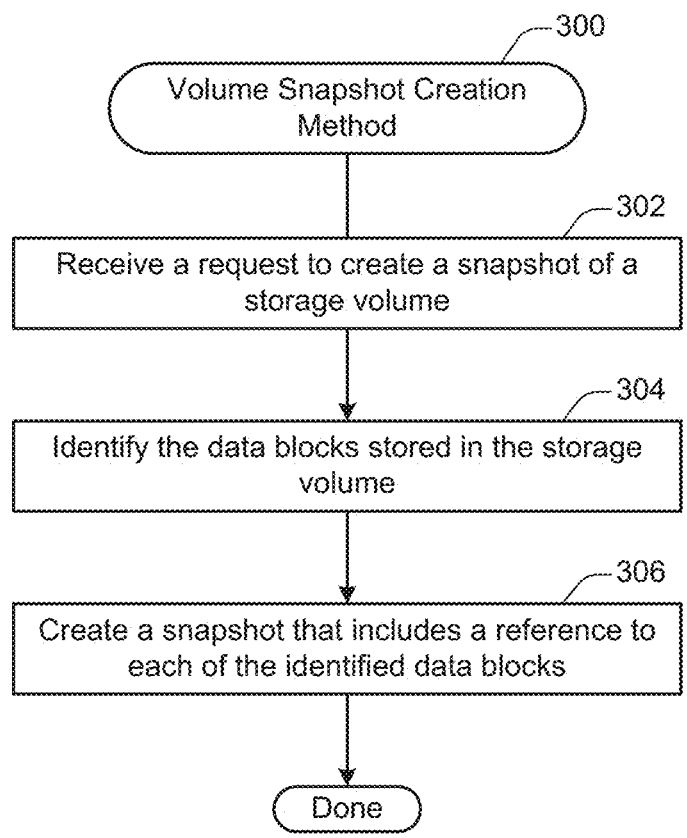
FIG. 3 illustrates an example of a method for creating a snapshot of a volume, performed in accordance with one or more embodiments.

FIG. 3 illustrates an example of a method 300 for creating a snapshot of a volume, performed in accordance with one or more embodiments. The method 300 may be performed at a compute node such as the Node A 104 shown in FIG. 1.

At 302, a request is received to create a snapshot of a storage volume. According to various embodiments, the request may be generated dynamically, such as during the execution of the method 200 shown in FIG. 2. Alternately, the request may be generated automatically. For instance, a systems administrator may generate a request to create a snapshot of a volume.

At 304, the data blocks stored in the storage volume are identified. In some implementations, the data blocks may be identified by consulting a table or other data structure that lists the blocks. As discussed herein, a volume may be associated both with data blocks that available in the present state of the volume and with data blocks that are no longer available in the present state of the volume but that are included within a snapshot of the volume that captures a previous state.

A snapshot is created at 306. The snapshot includes the references to each of the identified data blocks. As is discussed with respect to FIG. 7, the volume may be implemented in a copy-on-write fashion. Accordingly, when a subsequent data write request involves writing data to one of the data blocks included in the snapshot, the block will be copied before executing the data write request. In this way, the data write request may be executed to update a current state of the volume while at the same time maintaining the state of the data block as captured in the snapshot.

Figure 4:
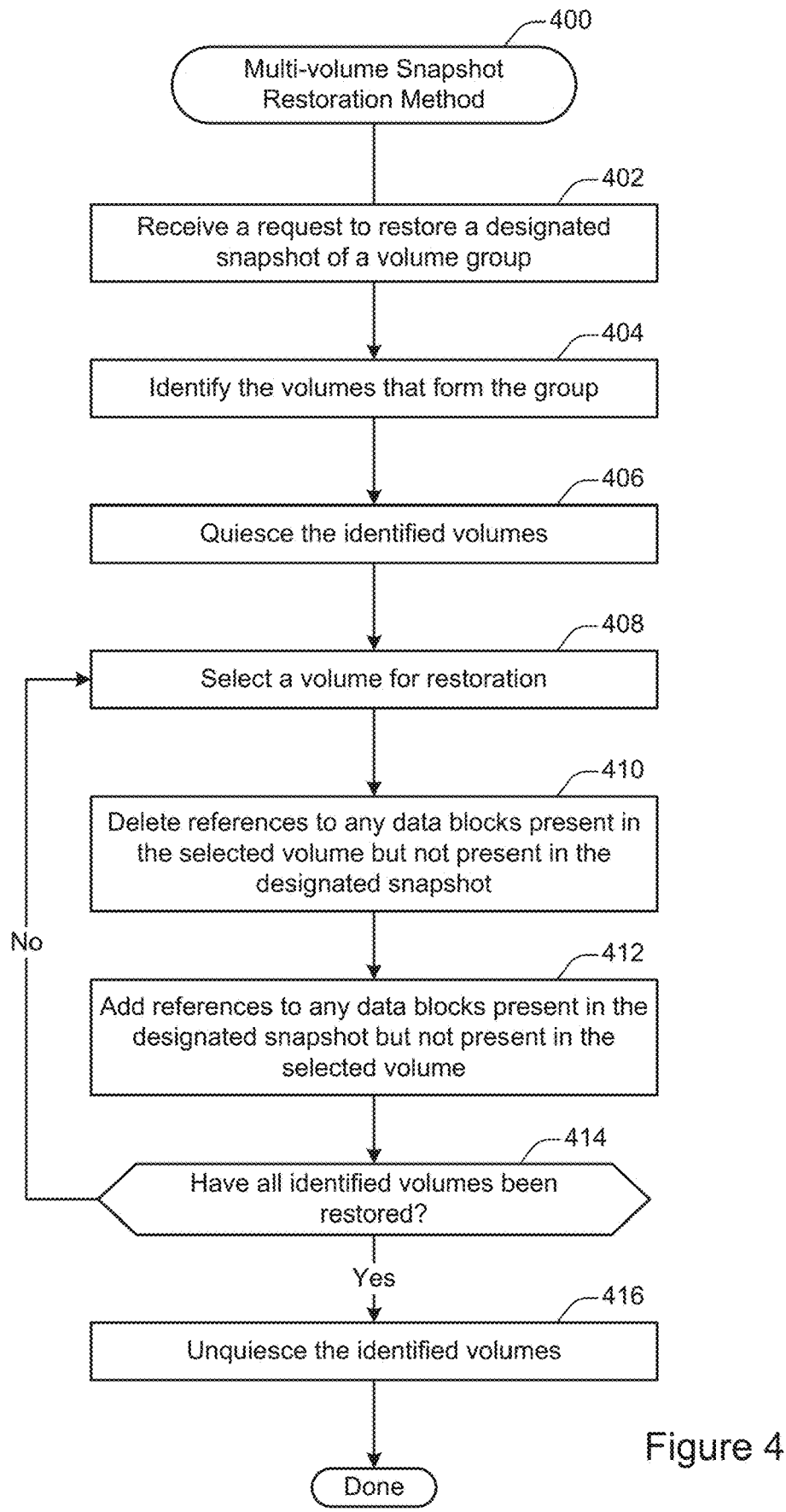
FIG. 4 illustrates an example of a method for restoring a multi-volume snapshot, performed in accordance with one or more embodiments.

FIG. 4 illustrates an example of a method 400 for restoring a multi-volume snapshot, performed in accordance with one or more embodiments. The method 400 may be performed at a compute node such as the Node A 104 shown in FIG. 1. The method 400 may be performed in order to restore two or more virtual storage volumes to their states at the point in time associated with the snapshot.

At 402, a request is received to restore a snapshot of a volume group. According to various embodiments, the volume group may be associated with one or more applications.

In some instances, the request may be automatically generated. For example, the system may detect that a volume has become corrected and automatically restore the volume to the most recently available snapshot. Alternately, the request may be generated by a user such as a systems administrator.

At 404, the volumes that form the group are identified. According to various embodiments, the volumes may be identified by analyzing the snapshot to determine the volumes included in the snapshot.

At 406, the identified volumes are quiesced. According to various embodiments, the volumes may be quiesced in a manner similar to that described with respect to operations 206-212 shown in FIG. 2. In particular embodiments, a volume may be detached instead of, or in addition to, being quiesced.

At 408, a volume is selected for restoration. According to various embodiments, the volumes may be restored sequentially, in parallel, or in any suitable order.

At 410, references in the volume to data blocks that are not present in the designated snapshot are deleted. The data blocks themselves may be retained on disk if they are referenced in any other snapshot. If a data block is not present in the designated snapshot or in any other snapshot, then the data block itself may be deleted.

At 412, references to any data blocks present in the designated snapshot but not present in the selected volume are added to the volume's block table. In this way, the volume may be quickly restored to its state as of the time the snapshot was captured.

At 414, a determination is made as to whether all identified volumes have been restored. If not, then an additional volume is selected for restoration at operation 408. If instead all volumes have been restored, then at 416 the identified volumes are unquiesced. According to various embodiments, the volumes may be unquiesced in a manner similar to that described with respect to operation 220 shown in FIG. 2. In particular embodiments, the volumes may be reattached instead of, or in addition to, being unquiesced.

In particular embodiments, operations shown in methods described herein may be performed in an order different than that described. For example, snapshots of volumes may be created and/or restored in parallel.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine and/or a storage container node as shown herein. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
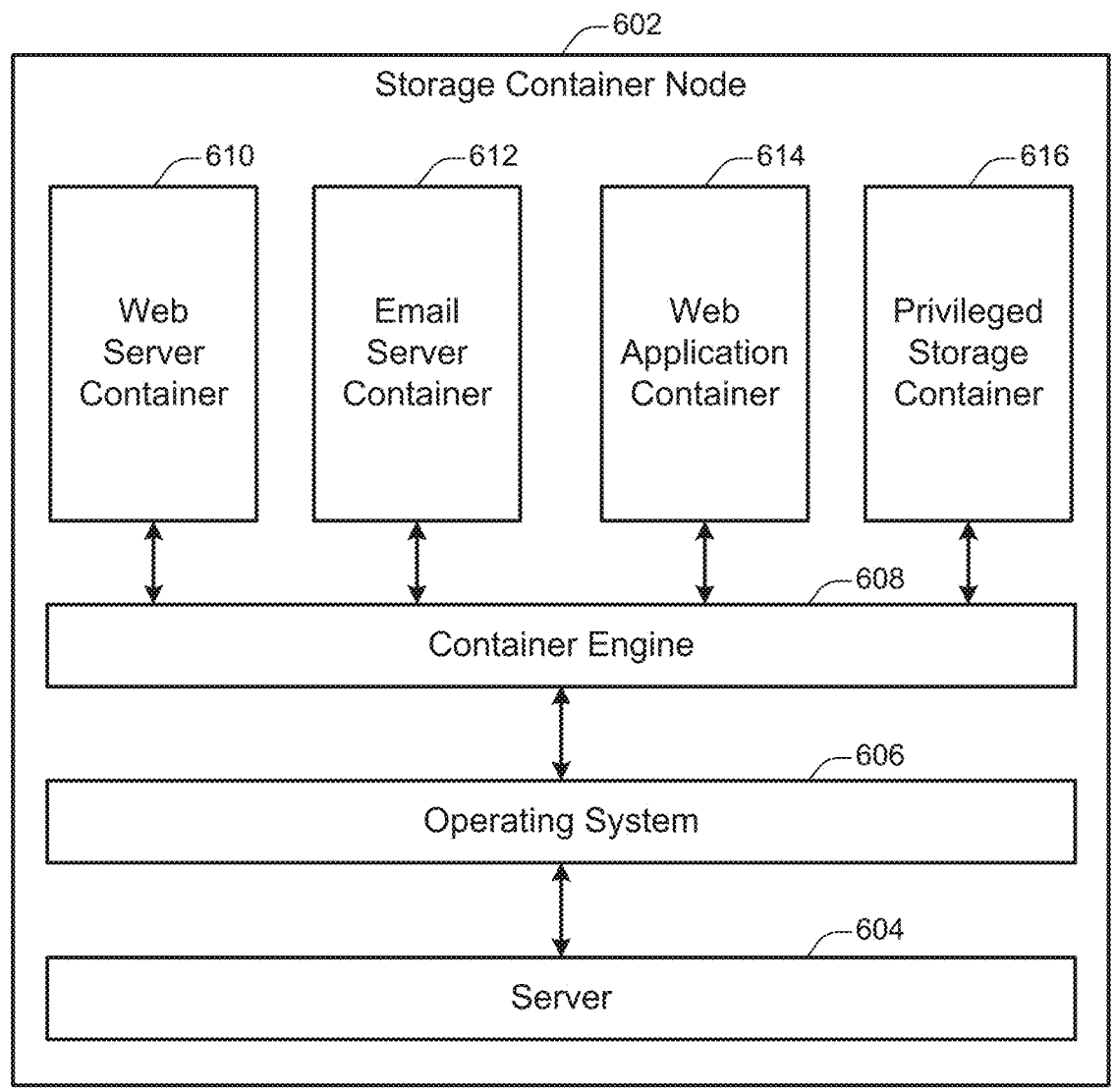
FIG. 6 illustrates an example of a storage container node, configured in accordance with one or more embodiments.

FIG. 6 illustrates an example of a storage container node 602. According to various embodiments, a storage container node may be a server configured to include a container engine and a privileged storage container. The storage container node 602 shown in FIG. 6 includes a server layer 604, an operating system layer 606, a container engine 608, a web server container 610, an email server container 612, a web application container 614, and a privileged storage container 616.

In some embodiments, the storage container node 602 may serve as an interface between storage resources available at a server instance and one or more virtual storage volumes that span more than one physical and/or virtual server. For example, the storage container node 602 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 602 may serve as an interface between storage resources available at a server instance and one or more virtual storage volumes that are replicated across more than one physical and/or virtual server. For example, the storage container node 602 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 604, the server layer is shown. According to various embodiments, the server layer may function as an interface by which the operating system 606 interacts with the server on which the storage container node 602 is implemented. A storage container node may be implemented on a virtual or physical server. For example, the storage container node 602 may be implemented at least in part on the server shown in FIG. 5. The server may include hardware such as networking components, memory, physical storage devices, and other such infrastructure. The operating system layer 606 may communicate with these devices through a standardized interface provided by the server layer 604.

At 606, the operating system layer is shown. According to various embodiments, different computing environments may employ different operating system layers. For instance, a physical or virtual server environment may include an operating system based on Microsoft Windows, Linux, or Apple's OS X. The operating system layer 606 may provide, among other functionality, a standardized interface for communicating with the server layer 604.

At 608, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 604, an operating system layer 606, and a container engine layer 608 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 602 includes the web server container 660, the email server container 612, and the web application container 614. A software container may include customized computer code configured to perform any of various tasks. For instance, the web server container 660 may provide files such as webpages to client machines upon request. The email server 612 may handle the receipt and transmission of emails as well as requests by client devices to access those emails. The web application container 614 may be configured to execute any type of web application, such as an instant messaging service, an online auction, a wiki, or a webmail service. Although that storage container node 602 shown in FIG. 6 includes three software containers, other storage container nodes may include various numbers and types of software containers.

At 616, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 610, 612, and 614 or other software containers located in different computing environments. For example, a software container may transmit a storage request to the container engine 608 via a standardized interface. The container engine 608 may transmit the storage request to the privileged storage container 616. The privileged storage container 616 may then communicate with privileged storage containers located on other storage container nodes and/or may communicate with hardware resources located at the storage container node 602 to execute the request. In some configurations, a privileged storage container is referred to herein as a scheduler agent.

In some implementations, one or more software containers may be afforded limited permissions in the computing environment in which they are located. For example, in order to facilitate a containerized software environment, the software containers 610, 612, and 614 may be restricted to communicating directly only with the container engine 608 via a standardized interface. The container engine 608 may then be responsible for relaying communications as necessary to other software containers and/or the operating system layer 606.

In some implementations, the privileged storage container 616 may be afforded additional privileges beyond those afforded to ordinary software containers. For example, the privileged storage container 616 may be allowed to communicate directly with the operating system layer 606, the server layer 604, and/or one or more physical hardware components such as physical storage devices. Providing the storage container 616 with expanded privileges may facilitate efficient storage operations such as storing, retrieving, and indexing data.

Figure 7:
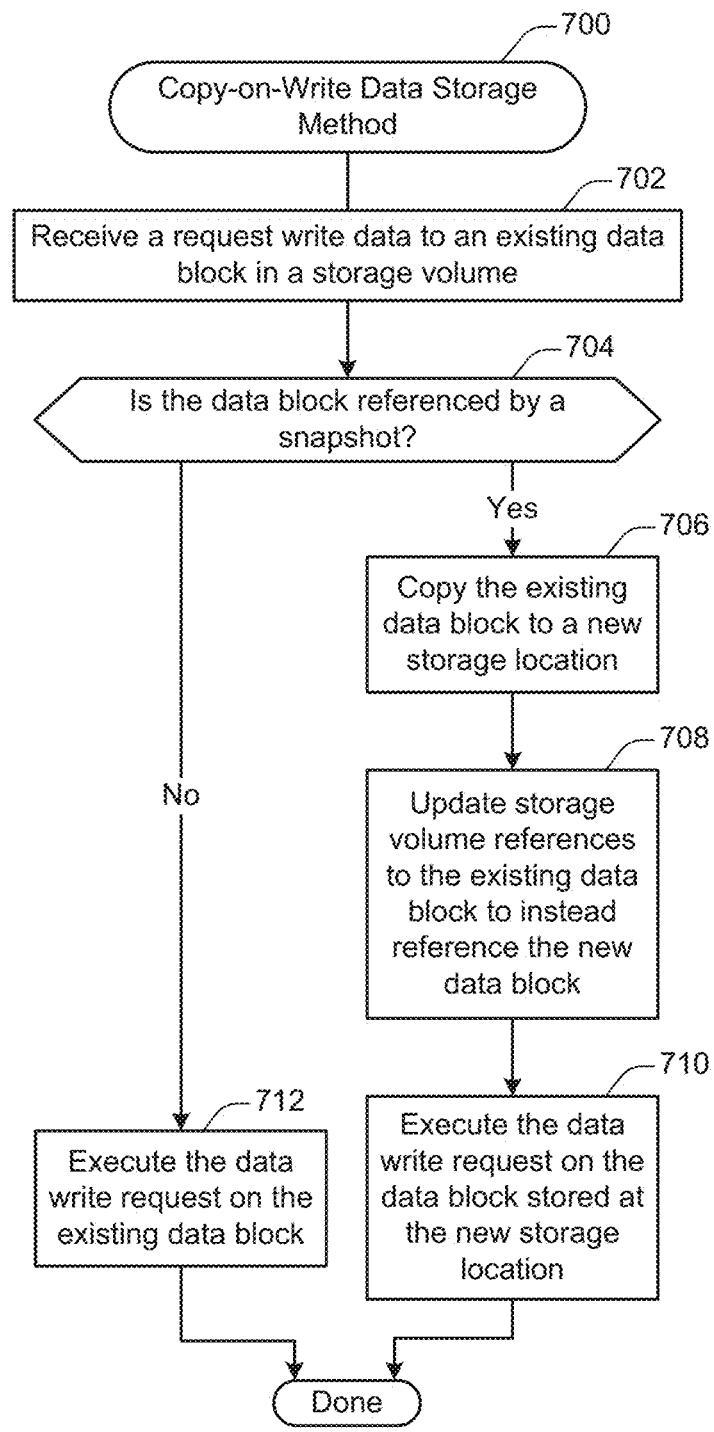
FIG. 7 illustrates an example of a method for storing data in a copy-on-write storage system, performed in accordance with one or more embodiments.

FIG. 7 illustrates an example of a method 700 for storing data in a copy-on-write storage system, performed in accordance with one or more embodiments. According to various embodiments, the method 700 may be performed in order to execute a write request that changes the state of data on a storage volume.

A request to write data to an existing data block in a storage volume is received at operation 702. In some embodiments, the request may include information such as a reference to a storage location of the data block, data to write to the data block, and a portion of the data block to be overwritten.

At 704, a determination is made as to whether the data block is referenced by a snapshot. According to various embodiments, the determination may be made at least in part by consulting a table that lists references to data blocks stored in association with the storage volume. If the data block is not referenced by a snapshot, then the data write request may be executed on the existing data block at operation 712.

If instead the data block is referenced by a snapshot, then at 706 the existing data block is copied to a new storage location. Storage volume references to the existing data block are then updated to refer to the new data block at the new storage location at operation 708. The references that are updated may exclude those that are included in a snapshot so that the snapshots continue to refer to the existing data block as it is maintained in its previous state.

At 710, the data write request is executed on the data block stored at the new storage location. According to various embodiments, executing the data write request may involve writing the data identified in the request received at 702 to the appropriate location within the data block.

Figure 8:
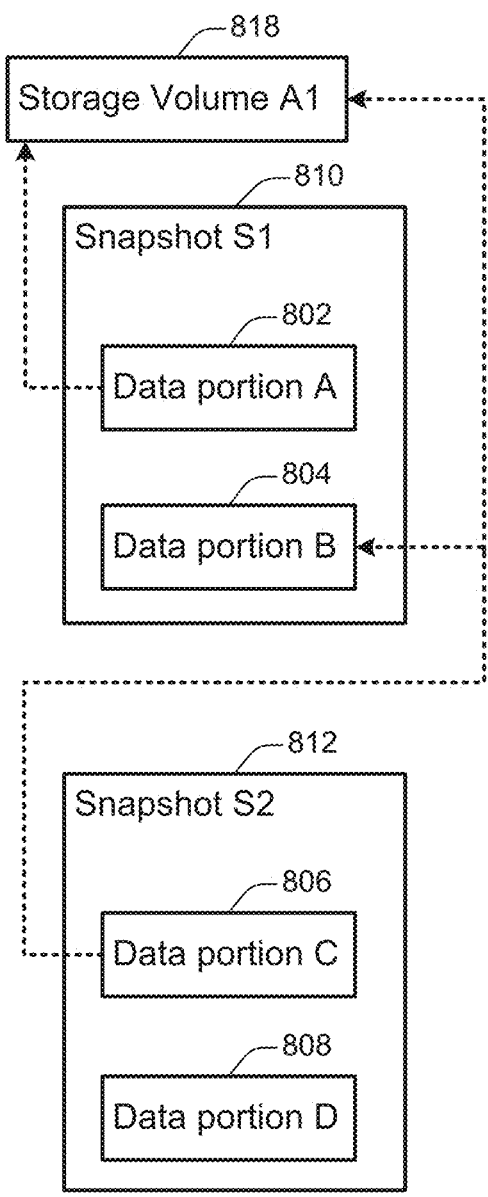
FIG. 8 illustrates an example of a configuration of data, provided in accordance with one or more embodiments.

FIG. 8 illustrates an example of a configuration of data, provided in accordance with one or more embodiments. The configuration of data shown in FIG. 8 includes Snapshot S1 810 and Snapshot S2 812, both of which correspond to Volume A1 818. The snapshots included data portions A-D 802-808.

According to various embodiments, a virtual storage volume may include some number of data blocks. Some of those data blocks may be associated with a current state of the virtual storage volume. Other data blocks may be associated with a previous state of the virtual storage volume. For instance, these other data blocks may have been overwritten by subsequent data write requests.

In some implementations, in order to perform operations such as restoring the virtual storage volume to a previous state and/or increasing a replication factor of a virtual storage volume, a request to overwrite a data block may be implemented as a copy-on-write, in which the original data is duplicated prior to executing the write request. In this way, the data block exists in both its overwritten and previous state, which facilitates the creation of snapshots capable of being used to restore the storage volume to a state at a particular point in time.

According to various embodiments, a snapshot itself may include a list of identifiers associated with data blocks associated with the virtual storage volume. Snapshots may be captured in a sequentially significant manner. In the example configuration shown in FIG. 8, the Snapshot S1 810 represents the first snapshot captured of the Volume A1 818. The data included in the Snapshot S1 810 includes two portions. The data portion A 802 includes data blocks that currently remain in Volume A1 818. Because the data blocks included in data portion A 802 are still in Volume A1 818, the Snapshot S1 810 does not store a copy of the data blocks included in data portion A 802. Instead, the data portion A 802 is stored as a set of one or more references to the data blocks as they reside in the Volume A1. For example, a reference may act as a memory pointer, which typically requires substantially less storage space than the memory to which it refers.

The data portion B 804 includes data blocks that were present in the Volume A 818 at the time the Snapshot S1 810 was captured but is no longer present in the Volume A 818 at the current point in time. A copy of this data is stored in association with the Snapshot S1 810 so that it is available if a request to restore the system to the state represented in the Snapshot S1 810 is received.

The Snapshot S2 812 represents the second snapshot captured of the Volume A1 818. The data blocks included in the Snapshot S2 812 include two portions. The data portion C 806 includes data blocks included in the Snapshot S1 810. Because the data blocks included in data portion C 806 are still in the Snapshot S1 810, the Snapshot S2 812 does not store a copy of the data blocks included in data portion C 806. Instead, the data portion C 806 is stored as a set of one or more references to the data blocks as they reside in the Snapshot S2 812.

In particular embodiments, the references in the data portion C 806 may be pointers to data blocks stored in the Snapshot S1 810 (e.g., in the data portion B 804) or may be pointers to references to data blocks stored in the storage volume A1 818. For example, some of these references may point to data blocks stored by value in the Snapshot S1 810 (i.e. in the data portion B 804) that no longer remain in the Storage Volume A1 818. As another example, other references may point to data blocks that do remain in the Storage Volume A1 818. Thus, the data portion C 806 and the data portion A 802 may include some of the same references to data blocks that remain in the storage volume A1 818.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   identifying, based on a request to construct a snapshot for a first container application executing on one or more compute nodes, a plurality of virtual data storage volumes associated with the first container application, each of the one or more compute nodes including an operating system and a container engine that runs in the operating system, the first container application restricted to communicating directly only with the container engine, wherein access between the first container application and the plurality of virtual data storage volumes is facilitated by a second container application that executes on the one or more compute nodes and that attaches the plurality of virtual data storage volumes to the one or more compute nodes, the second container application allowed to communicate directly with the container engine and with at least one other element of the one or more compute nodes;
   quiescing each of the plurality of virtual data storage volumes by storing in one or more queues each of a plurality of data access requests, each data access request indicating a respective storage volume in which to operate on data, the plurality of data access requests not being executed while the virtual data storage volumes are quiesced, wherein quiescing each of the plurality of virtual data storage volumes occurs in parallel;
   after quiescing each of the plurality of virtual data storage volumes, executing a pending write request stored in memory;
   after executing the pending write request, constructing a respective snapshot of each of the plurality of virtual data storage volumes, wherein each of the respective snapshots capture a respective state of the respective virtual data storage volume at a designated point in time after the plurality of virtual data storage volumes are quiesced; and
   after the snapshots have been constructed, unquiescing each of the plurality of virtual data storage volumes by executing the queued data access requests.

2. The method recited in claim 1, wherein the plurality of virtual data storage volumes store data associated with the first container application executing on the one or more compute nodes.

3. The method recited in claim 2, wherein the respective snapshots combine to provide a consistent restore point for restoring a state of the first container application to the designated point in time.

4. The method recited in claim 1, wherein each of the virtual storage volumes is implemented within a copy-on-write storage framework.

5. The method recited in claim 1, wherein each snapshot includes a respective set of references to data blocks stored in the respective storage volume at the designated point in time.

6. The method recited in claim 1, wherein a first data access request identifies data to write to a first location on a first one of the virtual data storage volumes.

7. The method recited in claim 6, wherein a second data access request identifies data to read from a second location on a second one of the virtual data storage volumes.

8. The method recited in claim 1, wherein a designated one of the plurality of virtual storage volumes includes storage space on a plurality of disks accessible to the one or more compute nodes via a network.

9. The method recited in claim 1, wherein the container engine provides a standardized platform for the instantiation and execution of containerized applications on the one or more compute nodes.

10. The method recited in claim 1, wherein an instance of the second container application executing on one compute node of the one or more compute nodes is configured to communicate with another instance of the second container application executing on another compute node of the one or more compute nodes to manage the plurality of virtual data storage volumes associated with the first container application.

11. One or more non-transitory machine-readable media having instructions stored thereon for performing a method, the method comprising:
    identifying, based on a request to construct a snapshot for a first container application executing on one or more compute nodes, a plurality of virtual data storage volumes associated with the first container application, each of the one or more compute nodes including an operating system and a container engine that runs in the operating system, the first container application restricted to communicating directly only with the container engine, wherein access between the first container application and the plurality of virtual data storage volumes is facilitated by a second container application that executes on the one or more compute nodes and that attaches the plurality of virtual data storage volumes to the one or more compute nodes, the second container application allowed to communicate directly with the container engine and with at least one other element of the one or more compute nodes;
    quiescing each of the plurality of virtual data storage volumes by storing in one or more queues each of a plurality of data access requests, each data access request indicating a respective storage volume in which to operate on data, the plurality of data access requests not being executed while the virtual data storage volumes are quiesced, wherein quiescing each of the plurality of virtual data storage volumes occurs in parallel;
    after quiescing each of the plurality of virtual data storage volumes, executing a pending write request stored in memory;
    after executing the pending write request, constructing a respective snapshot of each of the plurality of virtual data storage volumes, wherein each of the respective snapshots capture a respective state of the respective virtual data storage volume at a designated point in time after the plurality of virtual data storage volumes are quiesced; and
    after the snapshots have been constructed, unquiescing each of the plurality of virtual data storage volumes by executing the queued data access requests.

12. The one or more non-transitory machine-readable media recited in claim 11, wherein the plurality of virtual data storage volumes store data associated with the first container application executing on the one or more compute nodes, and wherein the respective snapshots combine to provide a consistent restore point for restoring a state of the first container application to the designated point in time.

13. The one or more non-transitory machine-readable media recited in claim 11, wherein each of the virtual storage volumes is implemented within a copy-on-write storage framework, and wherein each snapshot includes a respective set of references to data blocks stored in the respective storage volume at the designated point in time.

14. A computing device comprising:
    a processor; and
    a memory storing instructions configured to be executed by the processor to:
        identify, based on a request to construct a snapshot for a first container application executing on one or more compute nodes, a plurality of virtual data storage volumes associated with the first container application, each of the one or more compute nodes including an operating system and a container engine that runs in the operating system, the first container application restricted to communicating directly only with the container engine, wherein access between the first container application and the plurality of virtual data storage volumes is facilitated by a second container application that executes on the one or more compute nodes and that attaches the plurality of virtual data storage volumes to the one or more compute nodes, the second container application allowed to communicate directly with the container engine and with at least one other element of the one or more compute nodes;
        quiesce each of the plurality of virtual data storage volumes by storing in one or more queues each of a plurality of data access requests, each data access request indicating a respective storage volume in which to operate on data, the plurality of data access requests not being executed while the virtual data storage volumes are quiesced, wherein quiescing each of the plurality of virtual data storage volumes occurs in parallel;
        after quiescing each of the plurality of virtual data storage volumes, execute a pending write request stored in memory;
        after executing the pending write request, construct a respective snapshot of each of the plurality of virtual data storage volumes, wherein each of the respective snapshots capture a respective state of the respective virtual data storage volume at a designated point in time after the plurality of virtual data storage volumes are quiesced; and
        after the snapshots have been constructed, unquiesce each of the plurality of virtual data storage volumes by executing the queued data access requests.

15. The computing device recited in claim 14, wherein the plurality of virtual data storage volumes store data associated with the first container application executing on the one or more compute nodes.

16. The computing device recited in claim 15, wherein the respective snapshots combine to provide a consistent restore point for restoring a state of the first container application to the designated point in time.

17. The computing device recited in claim 14, wherein the second container application facilitates mounting of the plurality of virtual data storage volumes and facilitates data storage or retrieval requests associated with the mounted plurality of virtual data storage volumes.

18. The computing device recited in claim 14, wherein the at least one other element of the one or more compute nodes comprises a physical hardware component of the one or more compute nodes.

19. The computing device recited in claim 14, wherein the at least one other element of the one or more compute nodes comprises a physical storage device of the one or more compute nodes.

20. The computing device recited in claim 14, wherein an instance of the second container application executing on one compute node of the one or more compute nodes is configured to communicate with another instance of the second container application executing on another compute node of the one or more compute nodes to manage the plurality of virtual data storage volumes associated with the first container application.

* * * * *